UNITED STATES PATENT OFFICE.

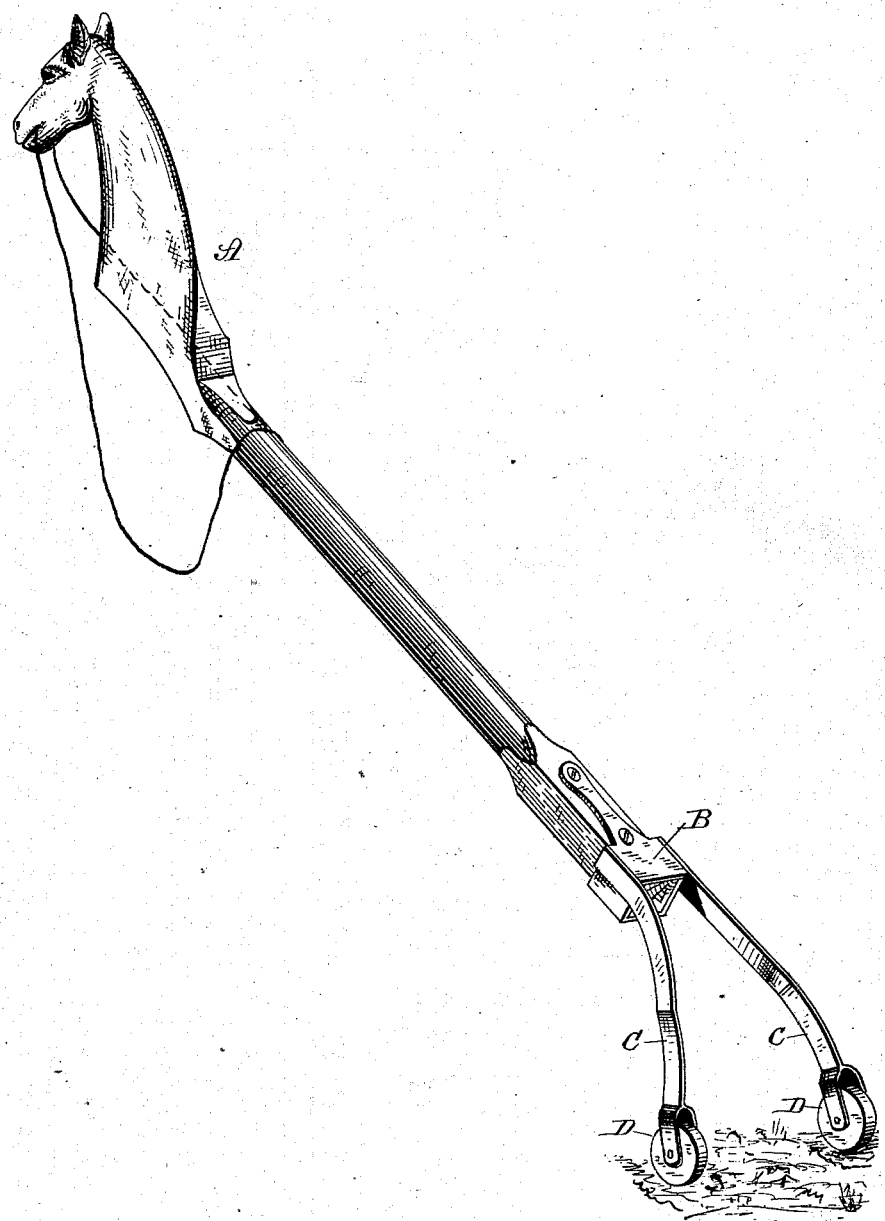

JOHN R. WHARRY, OF MOUNDSVILLE, WEST VIRGINIA.

HOBBY-HORSE.

SPECIFICATION forming part of Letters Patent No. 291,657, dated January 8, 1884.

Application filed November 19, 1883. (No model.)

*To all whom it may concern:*

Be it known that I, JOHN R. WHARRY, of Moundsville, in the county of Marshall and State of West Virginia, have invented certain new and useful Improvements in Hobby-Horses; and I do hereby declare the following to be a full, clear, and exact description of the invention, such as will enable others skilled in the art to which it pertains to make and use it, reference being had to the accompanying drawing, which forms part of this specification.

My invention relates to an improvement in hobby-horses; and it consists in the combination, with the hobby-horse, of two arms or braces provided with pulleys which are secured to its lower end, as will be more fully described hereinafter.

The object of my invention is to attach arms or braces provided with pulleys to the lower end of the horse, for the purpose of preventing it from turning around while in use, as is always the case where nothing of this kind is used.

The accompanying drawing represents a perspective of a hobby-horse embodying my invention.

A represents an ordinary hobby-horse, to the lower end of which is secured the ferrule B. Projecting from opposite sides of this ferrule are the metallic arms or braces C, to the lower ends of which are attached the rollers D, of any desired size. These arms branch outward from each other, so as to be separated from each other at their rear ends a sufficient distance to prevent the horse from turning over while in use, either when the child is moving straight or pulling upon one side of the bridle.

The great trouble with hobby-horses of the kind here shown has been that there was nothing to keep them from turning over, and they were just as apt to be head downward as in any other position. By means of my improvement the horse is always kept at the proper position, and it cannot be readily upset.

I do not limit myself to the ferrule, nor to metallic arms or braces, for wooden arms or braces may be made and secured in any suitable manner to opposite sides of the rear end of the horse. Instead of two separate and distinct arms which are fastened upon opposite sides of the horse, the two arms may be made in one solid piece of metal and attached in any suitable manner. I do not limit myself to any mere details in the manner of constructing these arms or braces, for they may be varied at will.

I claim—

The combination of the hobby-horse A, the ferrule B, applied to its lower end, the arms C, projecting therefrom, and the rollers D, substantially as shown and described.

In testimony whereof I affix my signature in presence of two witnesses.

JOHN R. WHARRY.

Witnesses:
 JOHN R. DAVIS,
 HENRY T. ANSHUTZ.